US012521666B2

(12) United States Patent
Huskisson

(10) Patent No.: US 12,521,666 B2
(45) Date of Patent: Jan. 13, 2026

(54) DUST FILTER FOR INTEGRATION WITH A CONVEYOR SKIRTING SYSTEM

(71) Applicant: Benetech, Inc., Aurora, IL (US)

(72) Inventor: Robert Huskisson, Oconomowoc, WI (US)

(73) Assignee: Benetech, Inc., Aurora, IL (US)

( * ) Notice: Subject to any disclaimer, the term of this patent is extended or adjusted under 35 U.S.C. 154(b) by 401 days.

(21) Appl. No.: 17/714,285

(22) Filed: Apr. 6, 2022

(65) Prior Publication Data

US 2022/0314158 A1 Oct. 6, 2022

Related U.S. Application Data

(60) Provisional application No. 63/171,354, filed on Apr. 6, 2021, provisional application No. 63/171,338, filed on Apr. 6, 2021.

(51) Int. Cl.
*B01D 46/71* (2022.01)
*B01D 46/00* (2022.01)
(Continued)

(52) U.S. Cl.
CPC ......... *B01D 46/71* (2022.01); *B01D 46/0005* (2013.01); *B01D 46/0049* (2013.01);
(Continued)

(58) Field of Classification Search
CPC .... B01D 46/71; B01D 46/58; B01D 46/0005; B01D 46/0049; B01D 46/0086;
(Continued)

(56) References Cited

U.S. PATENT DOCUMENTS

| 1,047,866 A | 12/1912 | Weller |
| 1,336,546 A | 4/1920 | Wall |
| (Continued) | | |

FOREIGN PATENT DOCUMENTS

| AU | 2005324346 A1 | 7/2006 |
| AU | 2005324346 B2 | 3/2011 |
| (Continued) | | |

OTHER PUBLICATIONS

US 11,091,332 B2, 08/2021, Lucas et al. (withdrawn)
(Continued)

*Primary Examiner* — Jennifer Dieterle
*Assistant Examiner* — Qianping He
(74) *Attorney, Agent, or Firm* — Benjamin D. Rotman; UB Greensfelder LLP

(57) ABSTRACT

The invention is directed to a dust filter system for integration with a conveyor skirting system. The systems are configured for handing dust from dry bulk materials being transported on a conveyor. The skirting system includes a top, a first side wall and a second side wall and is mounted above a portion of the conveyor. The dust filtering system is mounted on the top of the skirting system and includes an opening connected to a discharge plenum having a blower fan. A dust suppression manifold for spraying a chemical solution is connected to the top of the conveyor skirt downstream the dust filtering system.

22 Claims, 14 Drawing Sheets

(51) Int. Cl.
*B01D 46/04* (2006.01)
*B01D 46/24* (2006.01)
*B01D 46/44* (2006.01)
*B01D 46/52* (2006.01)
*B01D 46/58* (2022.01)
*B01D 47/06* (2006.01)
*B01D 50/60* (2022.01)

(52) U.S. Cl.
CPC ......... *B01D 46/0086* (2013.01); *B01D 46/04* (2013.01); *B01D 46/24* (2013.01); *B01D 46/442* (2013.01); *B01D 46/521* (2013.01); *B01D 46/58* (2022.01); *B01D 47/06* (2013.01); *B01D 46/2411* (2013.01); *B01D 50/60* (2022.01); *B01D 2273/30* (2013.01)

(58) Field of Classification Search
CPC ...... B01D 46/04; B01D 46/24; B01D 46/442; B01D 46/521; B01D 47/46; B01D 50/60; B01D 46/2411; B01D 2273/30; B01D 47/06; B01D 46/001; B01D 46/4272; B01D 46/0004; B01D 46/38; B01D 46/00; B01D 46/52; B01D 46/44; B08B 15/02; B65G 69/18; F16K 7/12; F16K 7/17
USPC ....................................... 96/244; 55/302, 467
See application file for complete search history.

(56) References Cited

U.S. PATENT DOCUMENTS

| | | |
|---|---|---|
| 1,400,658 A | 12/1921 | Brown |
| 1,524,334 A | 1/1925 | Brown |
| 1,789,069 A | 1/1931 | Gove |
| 1,791,371 A | 2/1931 | Onstad |
| 1,800,920 A | 4/1931 | Wilson et al. |
| 1,814,619 A | 7/1931 | Carter |
| 1,896,149 A | 2/1933 | Zademach |
| 2,219,226 A | 10/1940 | Gerber |
| 2,249,588 A | 7/1941 | Waddle |
| 2,859,873 A | 11/1958 | Bresee |
| 3,248,018 A | 4/1966 | Fleischman |
| 3,259,078 A | 7/1966 | Radey et al. |
| 3,344,909 A | 10/1967 | Hansen et al. |
| 3,568,819 A | 3/1971 | Mann |
| 3,858,733 A | 1/1975 | Morioka et al. |
| 3,926,290 A | 12/1975 | Isojima et al. |
| 4,039,062 A | 8/1977 | Carre et al. |
| 4,123,334 A | 10/1978 | Emery |
| 4,164,327 A | 8/1979 | Clark |
| 4,177,736 A | 12/1979 | Przybylinski et al. |
| 4,182,591 A | 1/1980 | Stanelle |
| 4,277,214 A | 7/1981 | Mahle et al. |
| 4,363,350 A | 12/1982 | Beckerer |
| 4,371,305 A | 2/1983 | Pannell |
| 4,489,862 A | 12/1984 | Diem |
| 4,552,573 A | 11/1985 | Weis et al. |
| 4,598,823 A | 7/1986 | Swinderman |
| 4,603,769 A | 8/1986 | Bach et al. |
| 4,623,056 A | 11/1986 | Flaugher |
| 4,643,293 A | 2/1987 | Swinderman |
| 4,721,425 A | 1/1988 | Strocker |
| 4,775,267 A | 10/1988 | Yamamoto |
| 4,821,861 A | 4/1989 | Shanahan |
| 4,867,353 A | 9/1989 | Jacek |
| 4,877,125 A | 10/1989 | Gordon |
| 4,878,576 A | 11/1989 | Dietzen |
| 4,946,018 A | 8/1990 | Binzen et al. |
| 5,016,686 A | 5/1991 | Gerstenkorn |
| 5,024,319 A | 6/1991 | Dixon et al. |
| 5,048,669 A | 9/1991 | Swinderman |
| 5,123,542 A | 6/1992 | Hoppe |
| 5,154,271 A | 10/1992 | Binzen |
| 5,154,280 A | 10/1992 | Mott |
| 5,160,222 A | 11/1992 | Noland |
| 5,190,132 A | 3/1993 | Stanelle et al. |
| 5,248,344 A | 9/1993 | Hoppe |
| 5,291,988 A | 3/1994 | Leonard |
| 5,348,572 A * | 9/1994 | Jelich ................ B01D 46/2407 96/417 |
| 5,368,192 A | 11/1994 | Ransom, II |
| 5,372,229 A | 12/1994 | Leibling |
| 5,441,321 A | 8/1995 | Karpisek |
| 5,673,779 A | 10/1997 | Spickelmire |
| 5,685,416 A | 11/1997 | Bonnet |
| 5,697,375 A | 12/1997 | Hickey |
| 5,697,408 A | 12/1997 | Reeves |
| 5,769,573 A | 6/1998 | Faas et al. |
| 5,800,112 A | 9/1998 | Stafford |
| 5,806,324 A | 9/1998 | Shaw |
| 5,993,117 A | 11/1999 | Lancaster et al. |
| 6,019,147 A | 2/2000 | Prescott et al. |
| 6,041,907 A | 3/2000 | Bonnette |
| 6,102,195 A | 8/2000 | Weikel |
| 6,270,732 B1 * | 8/2001 | Gardner ............ B01D 46/4254 422/186.04 |
| 6,315,159 B1 | 11/2001 | Paczkowski |
| 6,575,294 B1 | 6/2003 | Swinderman et al. |
| 6,578,694 B2 | 6/2003 | Harris et al. |
| 6,681,921 B1 | 1/2004 | Schroeder |
| 6,763,935 B2 | 7/2004 | Ostman |
| 6,827,025 B2 | 12/2004 | Gaydos et al. |
| 6,921,037 B2 | 7/2005 | Wysong et al. |
| 7,000,758 B2 | 2/2006 | Bjorklund |
| 7,003,850 B2 | 2/2006 | Gaydos et al. |
| 7,028,629 B2 | 4/2006 | Walcome |
| 7,036,647 B2 | 5/2006 | Malmberg |
| 7,228,956 B2 | 6/2007 | Pircon et al. |
| 7,258,228 B1 | 8/2007 | Herren |
| 7,364,034 B1 | 4/2008 | Clark et al. |
| 7,438,171 B1 | 10/2008 | Clark et al. |
| 7,464,661 B2 | 12/2008 | Baas et al. |
| 7,484,617 B1 | 2/2009 | Flood, Jr. et al. |
| 7,571,802 B2 | 8/2009 | Bowman |
| 7,735,620 B2 | 6/2010 | Swinderman |
| 7,743,927 B2 | 6/2010 | Svatek et al. |
| 7,855,343 B2 | 12/2010 | Nakagawa et al. |
| 7,958,992 B1 | 6/2011 | Stier |
| 8,006,830 B2 | 8/2011 | Swinderman |
| 8,319,122 B2 | 11/2012 | Kishikawa et al. |
| 8,607,964 B2 | 12/2013 | Kheifets |
| 8,727,108 B2 | 5/2014 | Dekoning |
| 8,800,756 B2 | 8/2014 | Pircon et al. |
| 8,960,419 B2 | 2/2015 | Kennedy et al. |
| 8,967,357 B2 | 3/2015 | Houssian et al. |
| 9,598,248 B2 | 3/2017 | Raiche |
| 9,919,938 B2 | 3/2018 | Soane et al. |
| 10,024,114 B2 | 7/2018 | Vandapel et al. |
| 10,035,669 B2 | 7/2018 | Harris et al. |
| 10,059,635 B2 | 8/2018 | Hay et al. |
| 10,246,265 B2 | 4/2019 | Schnitkey |
| 10,633,201 B2 | 4/2020 | D'Agostino et al. |
| 10,676,294 B2 | 6/2020 | Harrenstein et al. |
| 10,752,443 B1 | 8/2020 | Lwali et al. |
| 10,766,709 B2 | 9/2020 | Smith |
| 10,926,967 B2 | 2/2021 | Oren et al. |
| 11,027,932 B2 | 6/2021 | Harris |
| 11,066,259 B2 | 7/2021 | Warren et al. |
| 11,136,207 B2 | 10/2021 | Pircon et al. |
| 11,192,731 B2 | 12/2021 | Lucas et al. |
| 11,261,030 B2 | 3/2022 | Geysen |
| 11,273,994 B2 | 3/2022 | Huskisson et al. |
| 11,319,171 B2 | 5/2022 | Harris et al. |
| 11,332,328 B2 | 5/2022 | Harris et al. |
| 2004/0031666 A1 | 2/2004 | Ostman |
| 2006/0093444 A1* | 5/2006 | McConnell .......... B65G 69/181 406/197 |
| 2006/0151280 A1 | 7/2006 | Pircon et al. |
| 2010/0072035 A1 | 3/2010 | Brody et al. |
| 2014/0054140 A1 | 2/2014 | Pircon et al. |
| 2014/0190356 A1* | 7/2014 | Barrett ............... B01D 46/0004 55/505 |

(56) References Cited

U.S. PATENT DOCUMENTS

| | | | |
|---|---|---|---|
| 2015/0202558 A1* | 7/2015 | Barker | B01D 46/10 95/20 |
| 2018/0134507 A1 | 5/2018 | Lucas et al. | |
| 2018/0162643 A1 | 6/2018 | Delmoni | |
| 2018/0178999 A1 | 6/2018 | Sherwood et al. | |
| 2018/0251306 A1 | 9/2018 | Geysen | |
| 2020/0062513 A1 | 2/2020 | Hutchison et al. | |
| 2020/0354174 A1 | 11/2020 | Harris et al. | |
| 2020/0354175 A1 | 11/2020 | Harris et al. | |
| 2021/0053781 A1 | 2/2021 | Pircon et al. | |
| 2021/0188564 A1 | 6/2021 | Rutkevicius et al. | |
| 2021/0261355 A1 | 8/2021 | Huskisson et al. | |
| 2021/0339966 A1 | 11/2021 | Lucas et al. | |
| 2022/0024707 A1 | 1/2022 | Pircon et al. | |
| 2022/0080479 A1 | 3/2022 | Baker et al. | |
| 2022/0106106 A1 | 4/2022 | Holmes et al. | |
| 2022/0135336 A1 | 5/2022 | Geysen | |

FOREIGN PATENT DOCUMENTS

| | | | | |
|---|---|---|---|---|
| CA | 2594426 A1 | 7/2006 | | |
| CA | 2594426 C | 5/2013 | | |
| CN | 2146460 Y | 11/1993 | | |
| CN | 101175679 A | 5/2008 | | |
| CN | 101175679 B | 12/2011 | | |
| CN | 206434968 U | * 8/2017 | | |
| CN | 209871537 U | * 12/2019 | | |
| CN | 112357626 A | * 2/2021 | | B65G 69/182 |
| DE | 1531910 A1 | 1/1970 | | |
| DE | 2404157 A1 | 7/1975 | | |
| DE | 2927316 B1 | 2/1980 | | |
| DE | 3023898 A1 | 1/1982 | | |
| EP | 0062769 A1 | 10/1982 | | |
| EP | 0369605 A1 | 5/1990 | | |
| EP | 0584441 A1 | 3/1994 | | |
| EP | 1129965 A2 | 9/2001 | | |
| EP | 1836112 B1 | 4/2012 | | |
| FR | 2207074 A1 | 6/1974 | | |
| FR | 2924037 A1 | * 5/2009 | | B02C 21/02 |
| GB | 2063099 A | * 6/1981 | | B01D 46/002 |
| ID | P0025168 B | 2/2010 | | |
| JP | 85747123 A | 3/1982 | | |
| JP | 2534253 Y2 | 4/1997 | | |
| JP | 10305907 A | 11/1998 | | |
| JP | 2008526652 A | 7/2008 | | |
| JP | 5393983 B2 | 1/2014 | | |
| KR | 19850005816 A | 9/1985 | | |
| KR | 1020070106996 A | 11/2007 | | |
| KR | 100908762 B1 | 7/2009 | | |
| KR | 1020100120555 A | 11/2010 | | |
| KR | 1020110056815 A | 5/2011 | | |
| KR | 1020130050738 A | 5/2013 | | |
| KR | 1020150125068 A | 11/2015 | | |
| KR | 1020160056698 A | 5/2016 | | |
| LU | 70952 A1 | 3/1975 | | |
| MX | 269719 | 9/2009 | | |
| NL | 7803864 A | 10/1978 | | |
| RU | 2007130548 A | 2/2009 | | |
| RU | 2389673 C2 | 5/2010 | | |
| WO | 2006076140 A2 | 7/2006 | | |
| WO | 2014031188 A1 | 2/2014 | | |
| WO | 2021035041 A1 | 2/2021 | | |
| WO | 2021167943 A1 | 8/2021 | | |
| ZA | 200705630 | 7/2008 | | |

OTHER PUBLICATIONS

Tsubaki Conveyor of America, Inc., One-Touch Inspection Door, product sheet, Summer 2010. Applicant Note: Applicant does not have access to this reference.

* cited by examiner

DUST FILTER FOR INTEGRATION WITH A CONVEYOR SKIRTING SYSTEM

CROSS-REFERENCE TO RELATED APPLICATIONS

The present invention claims priority to and the benefit of U.S. Provisional Patent Application No. 63/171,354 filed Apr. 6, 2021 and U.S. Provisional Patent Application No. 63/171,338 filed Apr. 6, 2021, the contents of which are incorporated herein by reference and made a part hereof.

The present application also relates to U.S. Utility patent application Ser. No. 17/714,273, now U.S. Pat. No. 12,214,309, entitled "Passive Dust Filter for Inspection Hatch," the contents of which are incorporated herein by reference.

FEDERALLY SPONSORED RESEARCH OR DEVELOPMENT

N/A

FIELD OF THE INVENTION

The present invention is directed to a dust filtering system integrated with a conveyor skirting system for eliminating dust from dry bulk materials transported on a conveyor.

DESCRIPTION OF THE PRIOR ART

Dust is a persistent problem associated with moving and storing dry bulk materials, such as coal and other mining materials, fertilizer, paper and wood products, and a large range of other materials. Not only is dust a health and safety issue, it can damage the machinery used for transporting the material requiring expensive equipment maintenance and repair. Dust can also cause environmental issues and can be a combustion risk.

In view of the numerous problems associated with dust generated by the bulk materials, a number of industries are heavily regulated, requiring companies in such industries to implement compliance measures. Efficient, cost-effective measures are needed to provide such compliance, and to ensure a safe work environment.

The present invention provides a dust filtering system integrated with a conveyor skirting system for handling dust transported on a conveyor system.

SUMMARY OF THE INVENTION

The present invention is directed to a dust filtering system which is integrated with a conveyor skirting system to eliminate dust associated with transporting dry bulk materials on a conveyor. The system is designed to capture a variety of dust types, including silica dust generated during material handling activities associated with loading, unloading and operation of conveyors. The dust filtering system is attached to a top of a conveyor skirting enclosure. The dust filtering system captures both passive dust displacement as well as active dust extraction with the use of a group of filter elements. As the outside surfaces of the dust filters continue to capture dust, the inside of the filters will be pulsed with compressed air from an air purge system to allow the captured dust build-up to be deposited back onto the conveyor where a dust suppression manifold sprays the pulsed dust to further enhance the dust's deposition to the conveyor. The filter elements are cylindrical and have a first closed end and an opposing second, open end. The filter elements are efficient, long lasting and are contained in an enclosure designed to be light weight, portable, re-useable and self-cleaning.

The system is designed as an active air filter that operates whenever the conveyor is in motion. The system is signaled from the conveyor control equipment. Air is drawn through the filter elements and discharged to the atmosphere by a blower fan attached to a discharge plenum connected to the filtering system. The filtering system is equipped with a differential pressure switch which measures air pressure prior to the filter elements (i.e., on the side of the filter elements exposed to the conveyor material) and the ambient air pressure on the other side of the filter elements. When the differential pressure reaches a set point (or at other desired times), an air purge circuit is activated causing diaphragm valves in the air purge system to activate and pulse the interior of the filter elements with compressed air through their open ends. The filtering system includes a supply of compressed air in a reservoir to ensure sufficient air volume for the pulse cycle. A capacitive discharge control circuit (or other control systems) will be used to regulate the sequence, timing and duration of the pulse cycle.

The filtering system is also equipped with a dust detection sensor to measure the presence of dust in the air within the plenum. This sensor performs as a contamination indicator that verifies whether or not the filters are damaged or dust is being allowed to pass to the atmosphere. In the event the sensor detects contamination, an alarm can be triggered to signal the need for service and/or replacement of filter elements.

As noted, the present dust filtering system and conveyor skirt system is also equipped with a spray manifold located on the discharge side of the conveyor skirting, downstream from the dust filtering system. When an air purge is performed, a solenoid valve will open and allow a chemical solution to spray from the manifold in order to suppress the dust generated by the air purge and deposit the dust back onto the conveyor belt.

In accordance with an aspect of the present invention, a system for handling dust on a conveyor transporting dry bulk materials is provided. The system comprises a conveyor skirt having a top, a first wall extending downward from a first side of the top and a second side wall extending downward from a second side of the top. A dust filtering system is connected to the top of the conveyor skirt and an air discharge plenum is connected to the dust filtering system. The dust filtering system can be connected over an opening in the top of the conveyor skirt by a mounting flange.

The system further comprises a dust suppression spray manifold which is also connected to the top of the conveyor skirt downstream from the dust filtering system. The dust suppression manifold is connected to a supply of a chemical solution for suppressing dust. The dust suppression spray manifold can be connected to the top of the conveyor skirt by a mounting plate.

The dust filtering system can include a filter containment unit, a plurality of filter elements secured in the filter containment unit and an air purge system in the filter containment unit. The filter containment unit can include a body portion and a top hingedly attached to the body portion. The dust filtering unit can also include a differential pressure switch coupled to the air purge system.

The air discharge plenum can comprise a duct connected to an opening in the filter containment unit. The duct can extend away from the filter containment unit to exhaust the clean air at a remote location. A blower fan can be coupled to the duct to facilitate movement of the air from the filter containment unit to the remote location.

The filter elements can be a cylindrical filter having a first closed end and a second open end mounted to a separation plate in the filter containment unit. The separation plate and filters define a clean air plenum on one side of the separation plate. The other side of the separation plate is exposed to the materials on the conveyor.

The air purge system includes a manifold coupled to a supply of compressed air. The manifold is positioned to pulse air into the open ends of the filter elements. A control circuit can be included for regulating the air purge system. The dust suppression spray manifold can be activated after activation of the air purge system.

The filter containment unit can also include a dust detection sensor in the clean air plenum. This can be used to determine whether the system needs service and/or replacement filters.

In accordance with another aspect of the present invention, a system for handling dust on a conveyor transporting dry bulk materials comprises a conveyor skirt having a top, a first wall extending downward from a first side of the top and a second side wall extending downward from a second side of the top. The system also comprises a dust filtering system connected to the top of the conveyor skirt. The dust filtering system includes a filter containment unit housing a plurality of filter elements and an air purge system.

The system cam further comprise an air discharge plenum connected to the dust filtering system. The air discharge plenum includes a blower fan coupled to the duct.

The system can also further comprise a dust suppression spray manifold connected to the top of the conveyor skirt downstream from the dust filtering system. The dust suppression spray manifold is connected to a supply of a dust suppression chemical solution.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying drawings in which.

DETAILED DESCRIPTION

Figure 1:
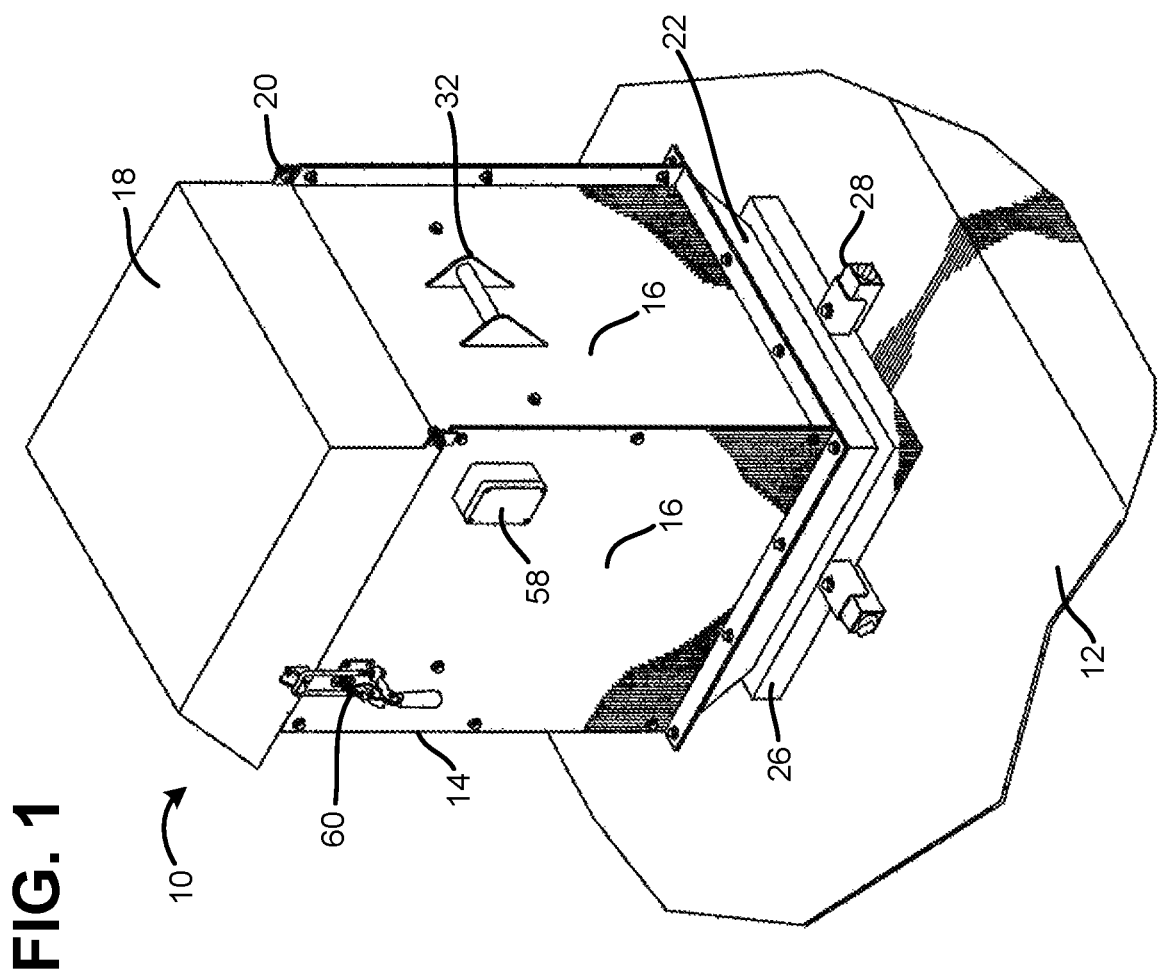
FIG. 1 is a perspective view of a dust filtering system connected to a hatch of a steel tank.
Figure 2:
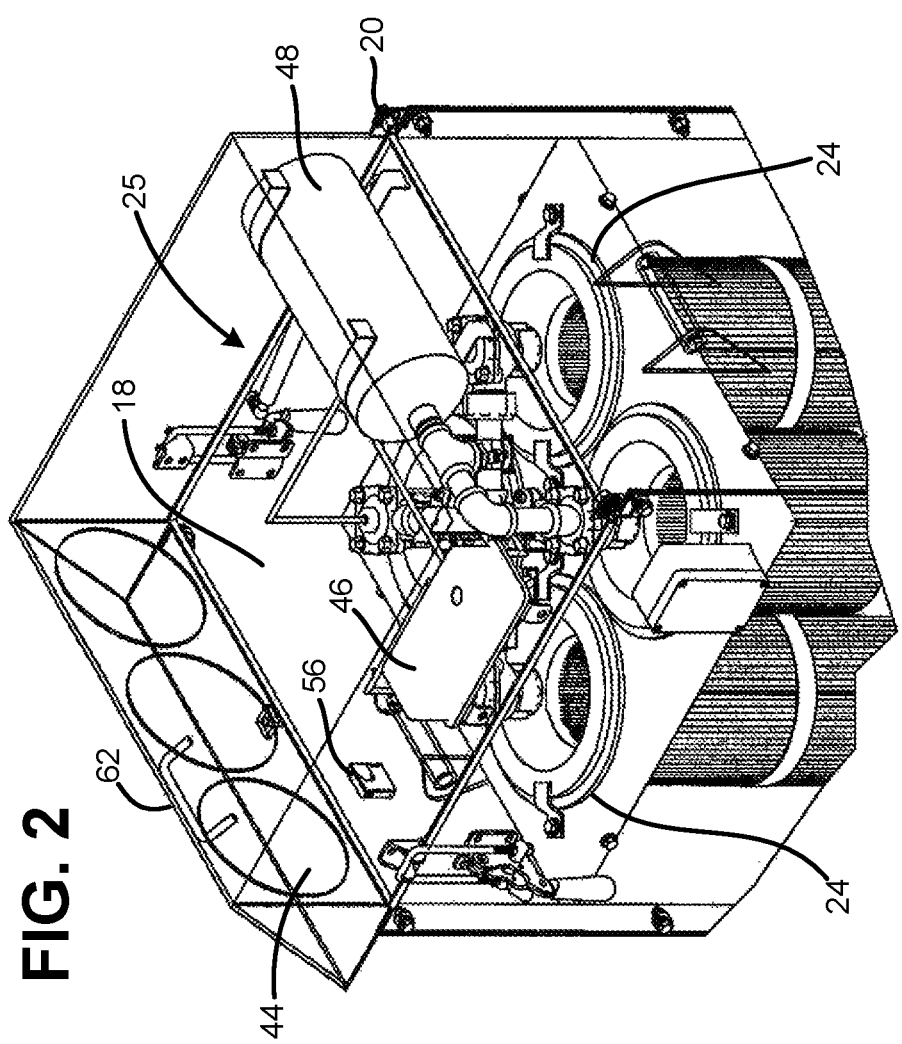
FIG. 2 is a perspective internal view of a portion of the dust filtering system of FIG. 1 (with transparent outer walls)
Figure 3:
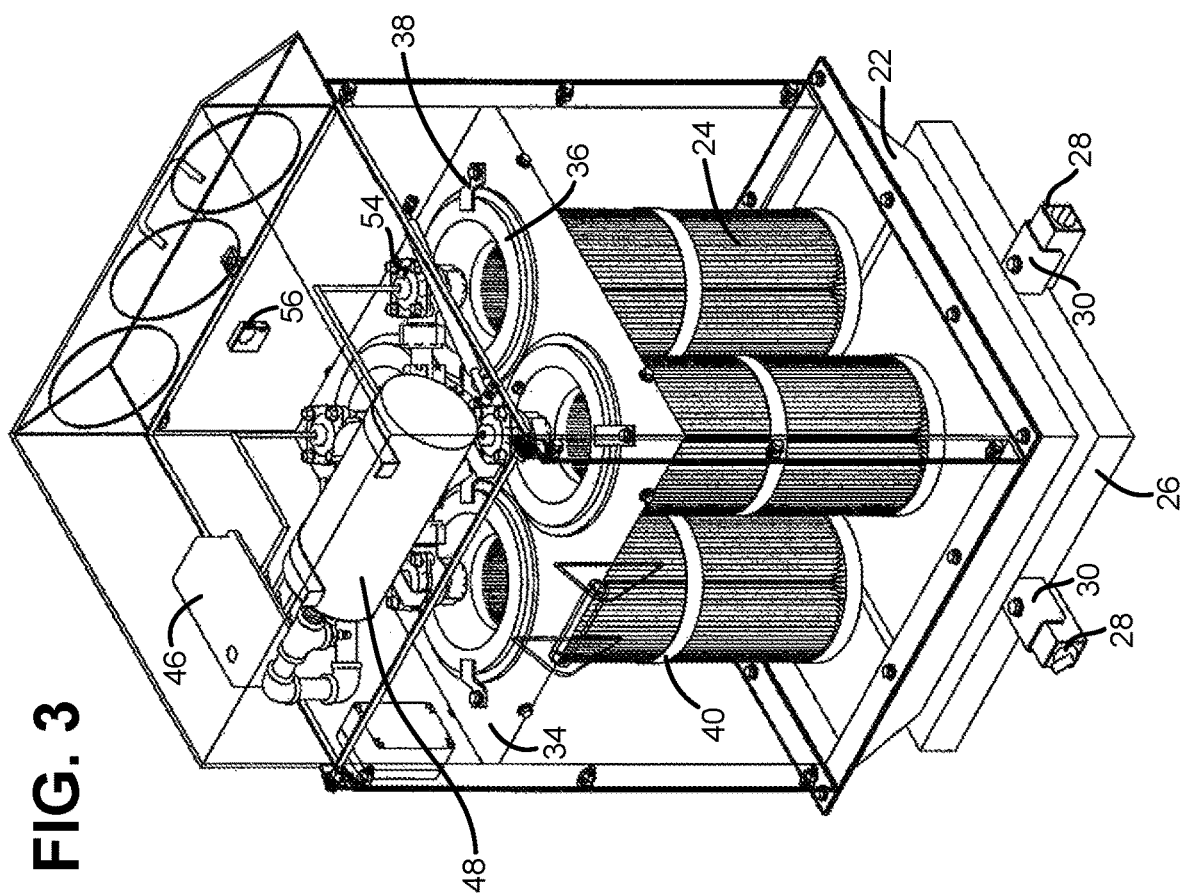
FIG. 3 is a perspective internal view of the dust filtering system of FIG. 1 from a different perspective than FIG. 1 (with transparent outer walls)
Figure 4:
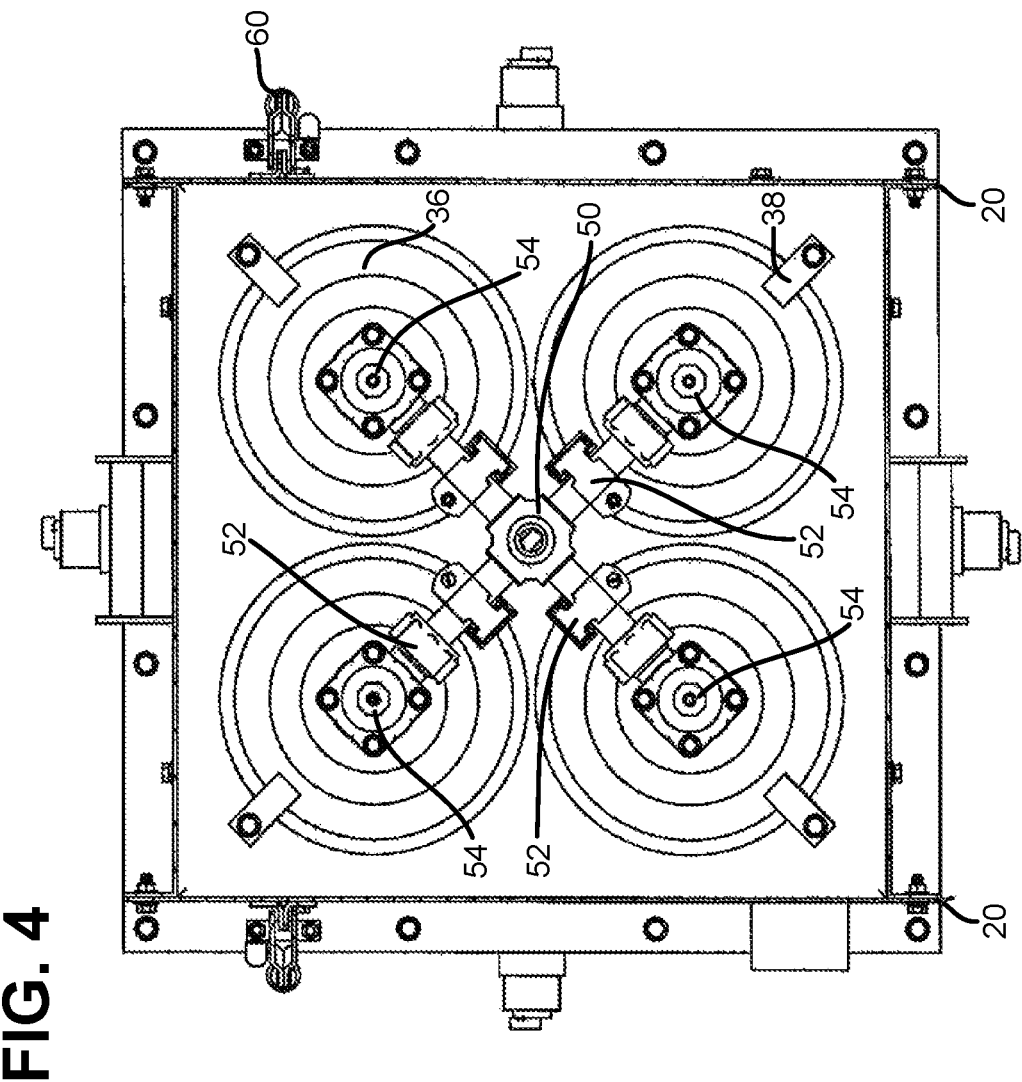
FIG. 4 is a top view of the filter elements of the dust filtering system of FIG. 1.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1-6 show the components of a passive dust filtering system 10 attached to an open hatch of a steel, dry bulk storage vessel or tank 12. As shown in FIG. 1, the system 10 includes a filter containment unit 14 having a plurality of side walls 16 and a top or lid 18 connected to the side walls 16 at an upper portion of the unit 14 by a hinge 20. The filter containment unit 14 includes an adapter section 22 for mounting the unit 14 to the tank 12. The filter containment unit 14 acts as an enclosure for a plurality of filter elements 24 and an air purge system 25 in an interior chamber of the unit 14.

The adapter section 22 includes a mounting flange 26 containing a gasket (for example, a compressible foam) for an airtight seal with the dry bulk storage tank 12. A plurality of magnetic switches 28 are connected to the mounting flange 26 by brackets 30. The magnetic switches 28 are spaced around the flange 26 and magnetically secure the containment unit 14 to the steel tank 12 when switched to an "on" position. The filter containment unit 14 can be removed from the tank 12 when the switches are turned "off." Handles 32 are provided on the outer surfaces of the side walls 16 to facilitate placement and positioning of the containment unit 14 onto and off of the tank 12.

Referring to FIGS. 2-6, each of the filter elements 24 has a cylindrical shape with one open end mounted to a separator plate 34 in the interior chamber of the filter containment unit 14. The separator plate 34 includes four openings—one for each of four filter elements 24—and spans horizontally across the interior chamber. The filter elements 24 have a closed bottom end and side walls of pleated filter material that extend upward to the open end. The open ends include an outer flange or lip that sits on the upper surface of the separator plate 34 when the remainder of the filter element is inserted into the opening in the plate 34. A hold down collar 36 and one or more hold down clips 38 keep each filter element 24 in place. One or more straps 40 keep the pleated filter material in the cylindrical shape.

The separator plate 34 and inserted filter elements 24 divide the interior chamber into a lower portion that is exposed—via an opening in the adapter section 22—to the interior of the tank 12, and an upper clean air plenum. The filter elements 24 prevent dust and other contaminants in the interior of the tank from entering the clean air plenum of the filter containment unit 14. The top 18 of the unit 14 includes a clean air vent 42 with outlets 44.

Figure 5:
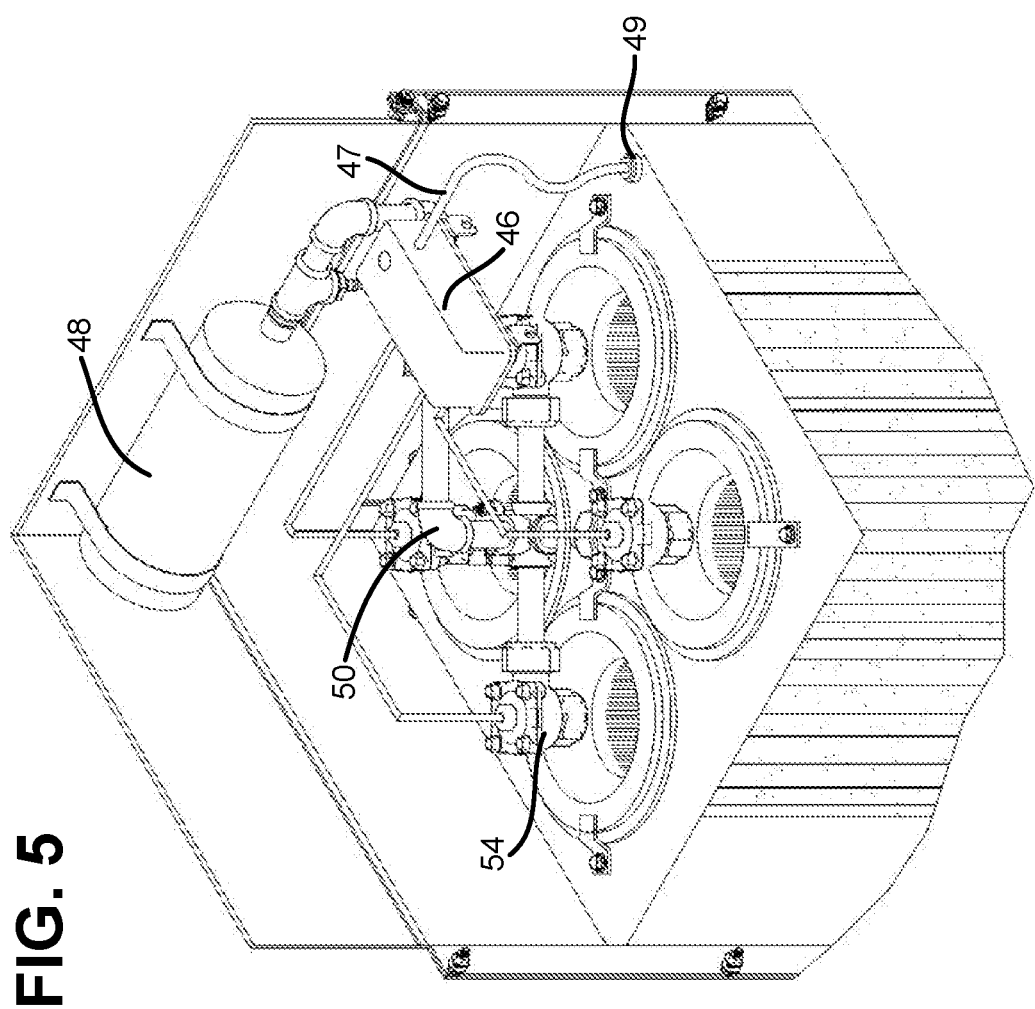
FIG. 5 is a perspective internal view of the dust filtering system of FIG. 1 illustrating the pulsed purge air components.
Figure 6:
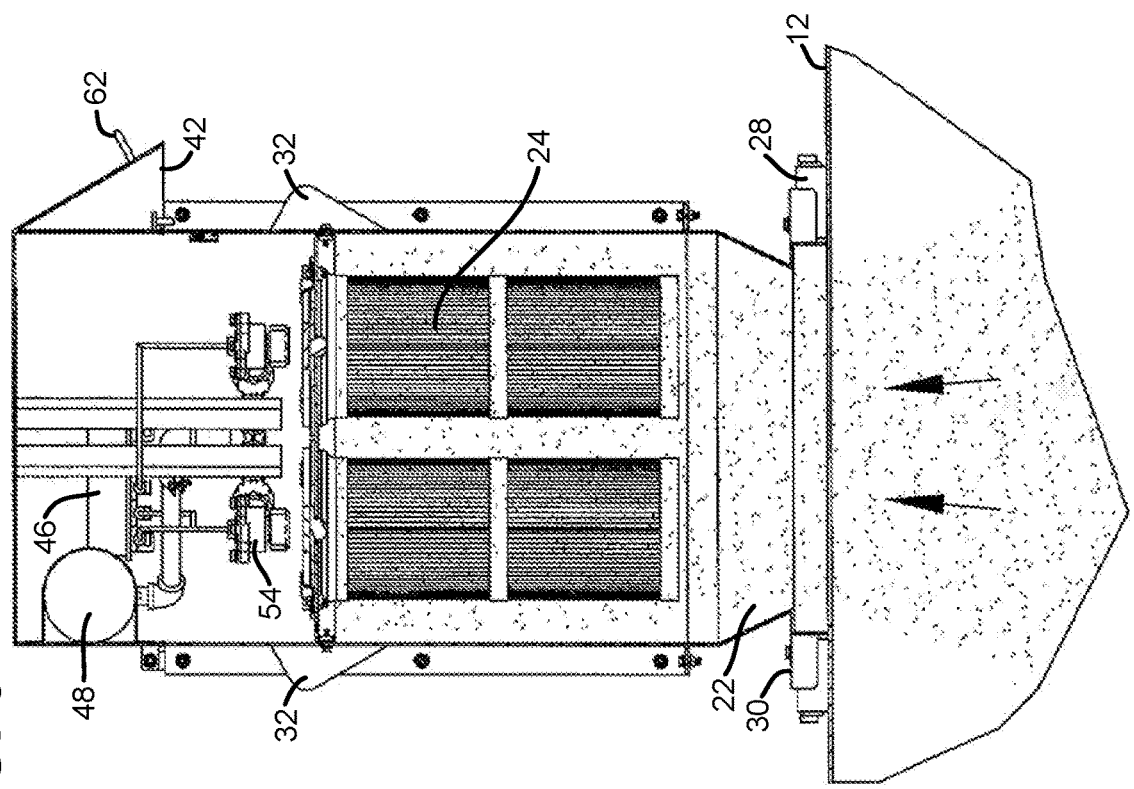
FIG. 6 is a side cross-sectional view of the dust filtering system of FIG. 1 and a portion of the steel tank.
Figure 7:
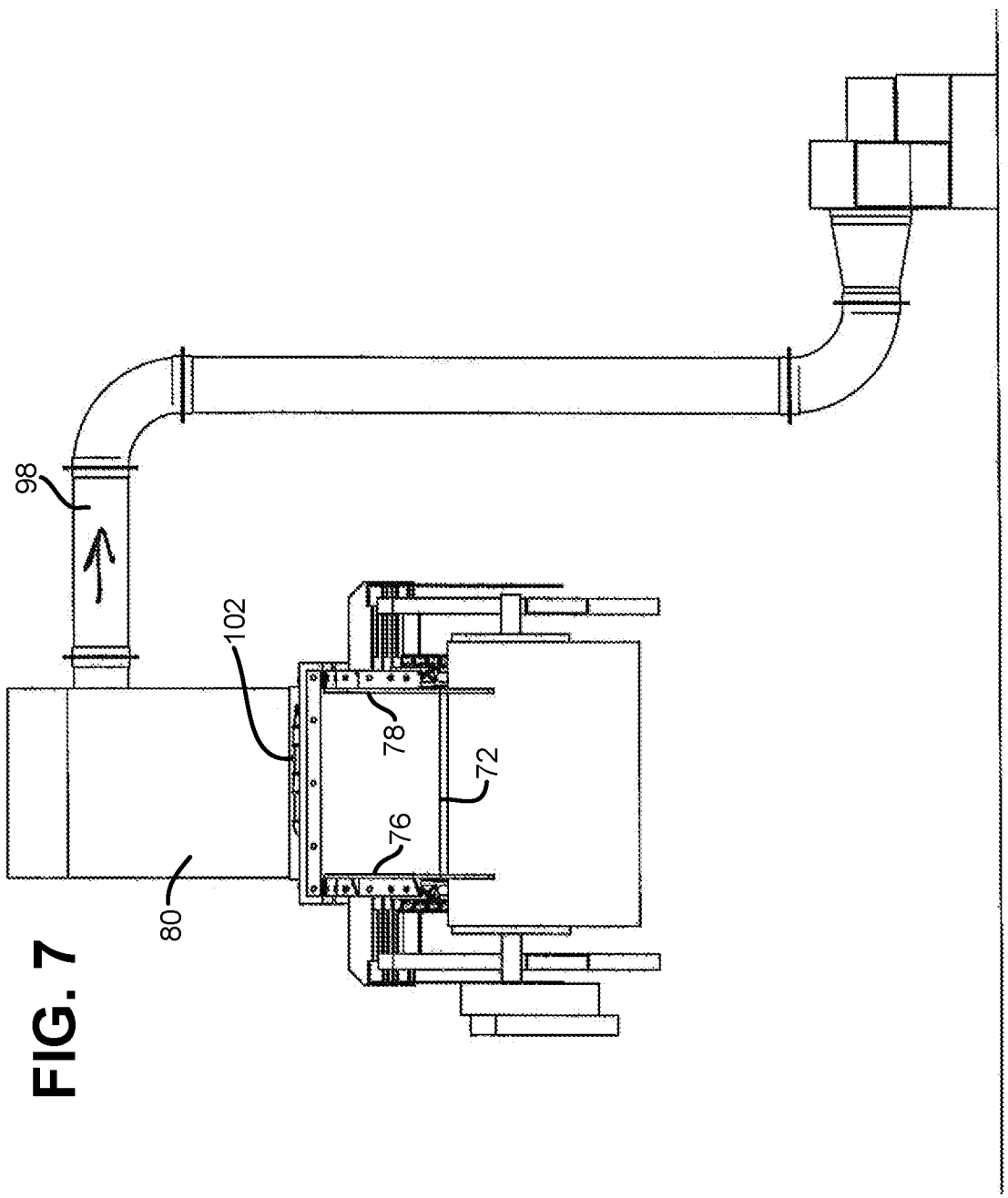
FIG. 7 is an end view of a dust filtering system with a conveyor skirt system in accordance with an aspect of the present invention.
Figure 8:
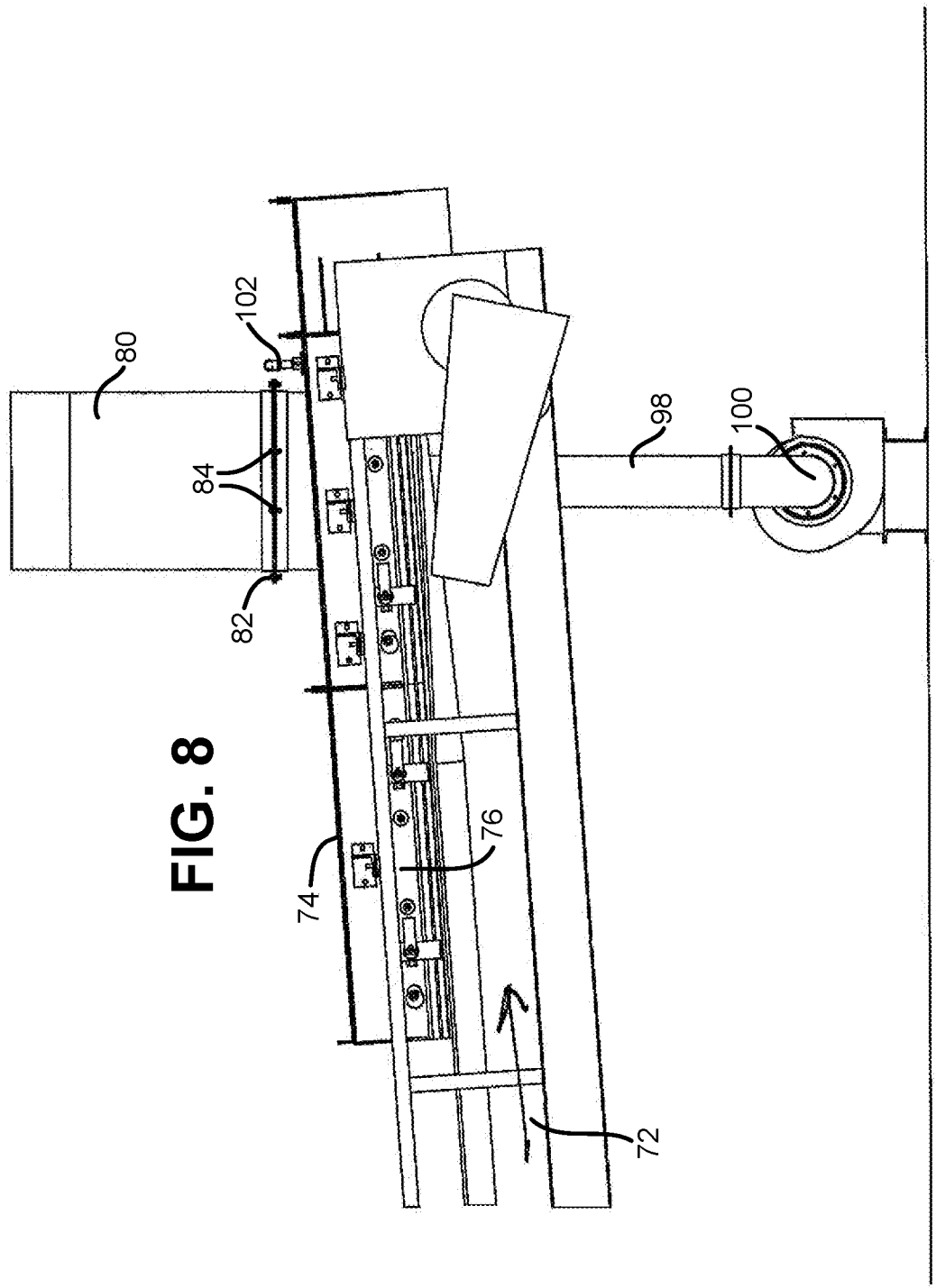
FIG. 8 is a first side view of the dust filtering system and conveyor skirt system of FIG. 7.
Figure 9:
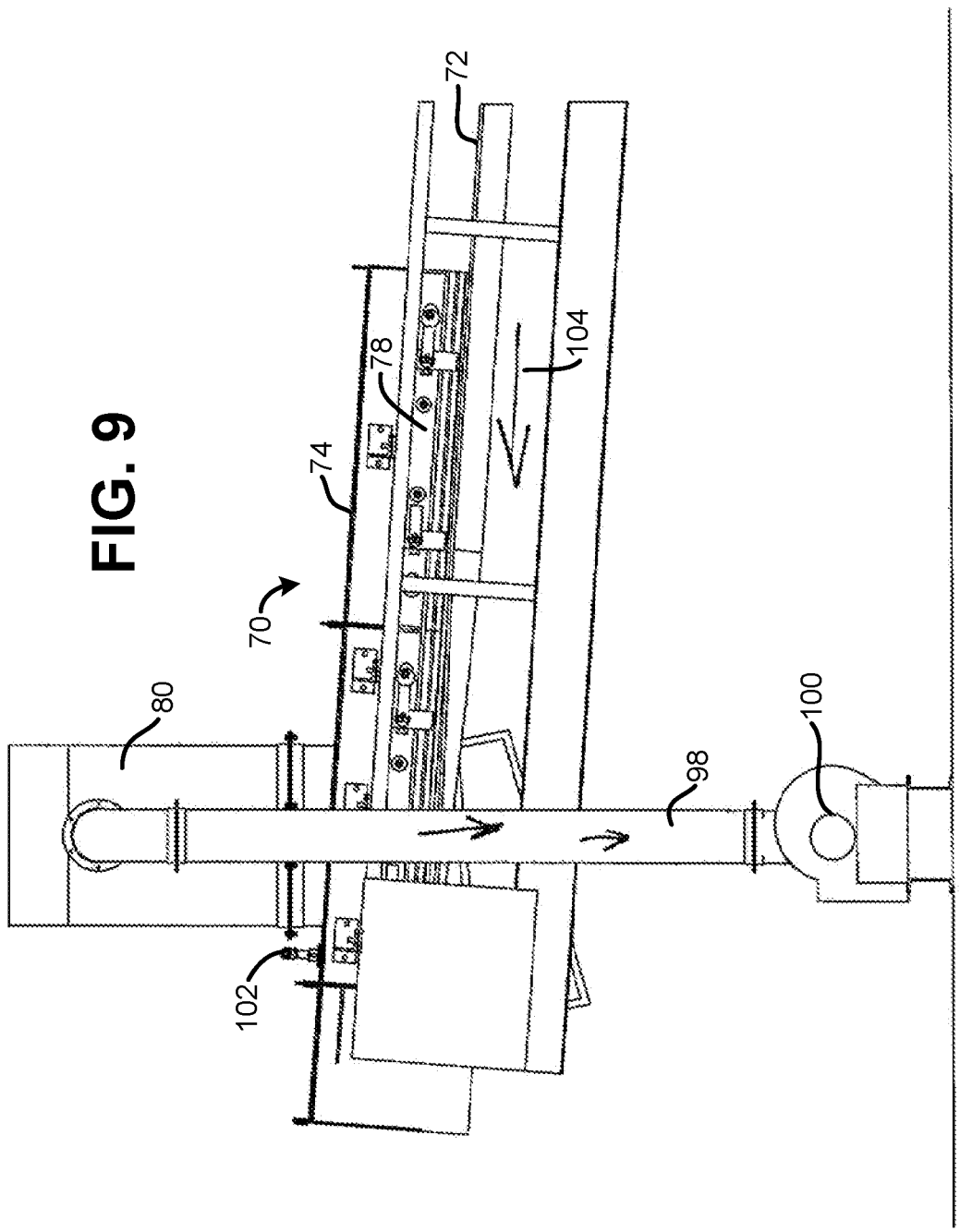
FIG. 9 is a second side view of the dust filtering system and conveyor skirt system of FIG. 7.
Figure 10:
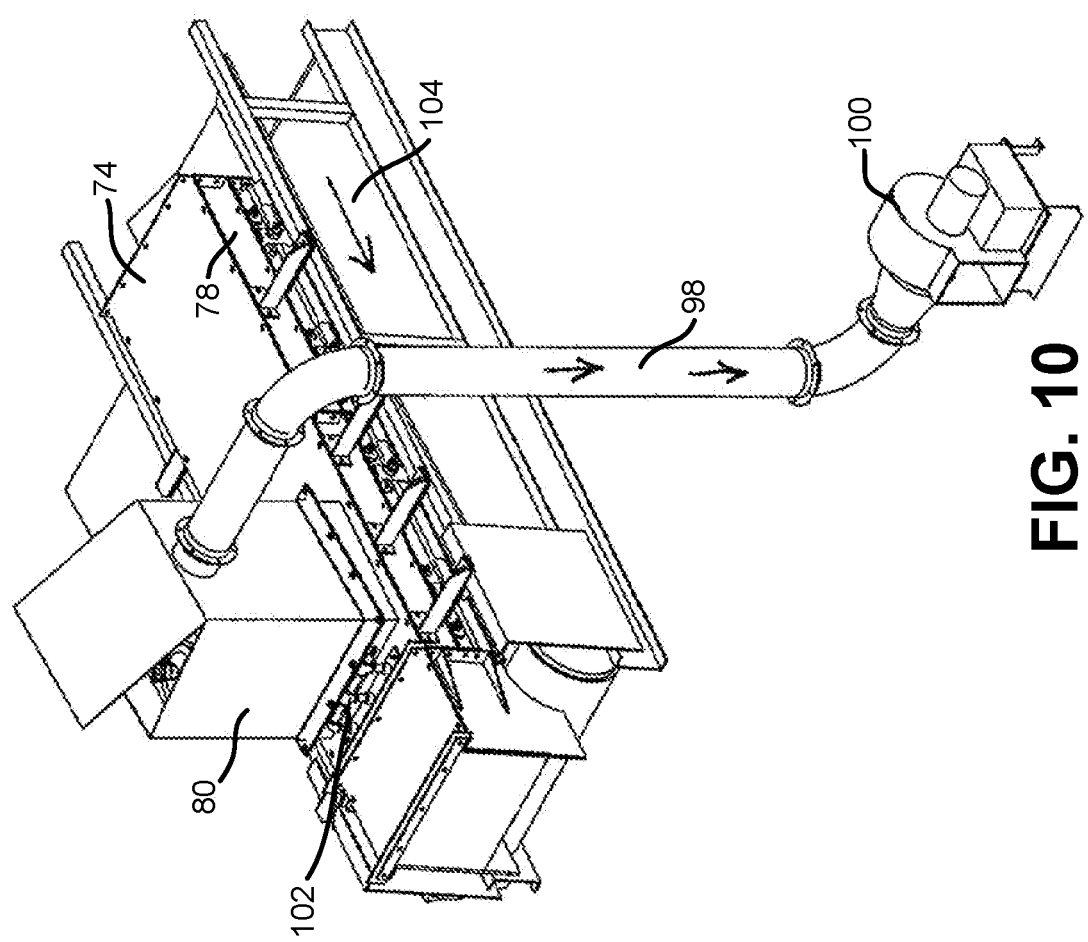
FIG. 10 is a perspective view of the first side of the dust filtering system and conveyor skirt system of FIG. 7.
Figure 11:
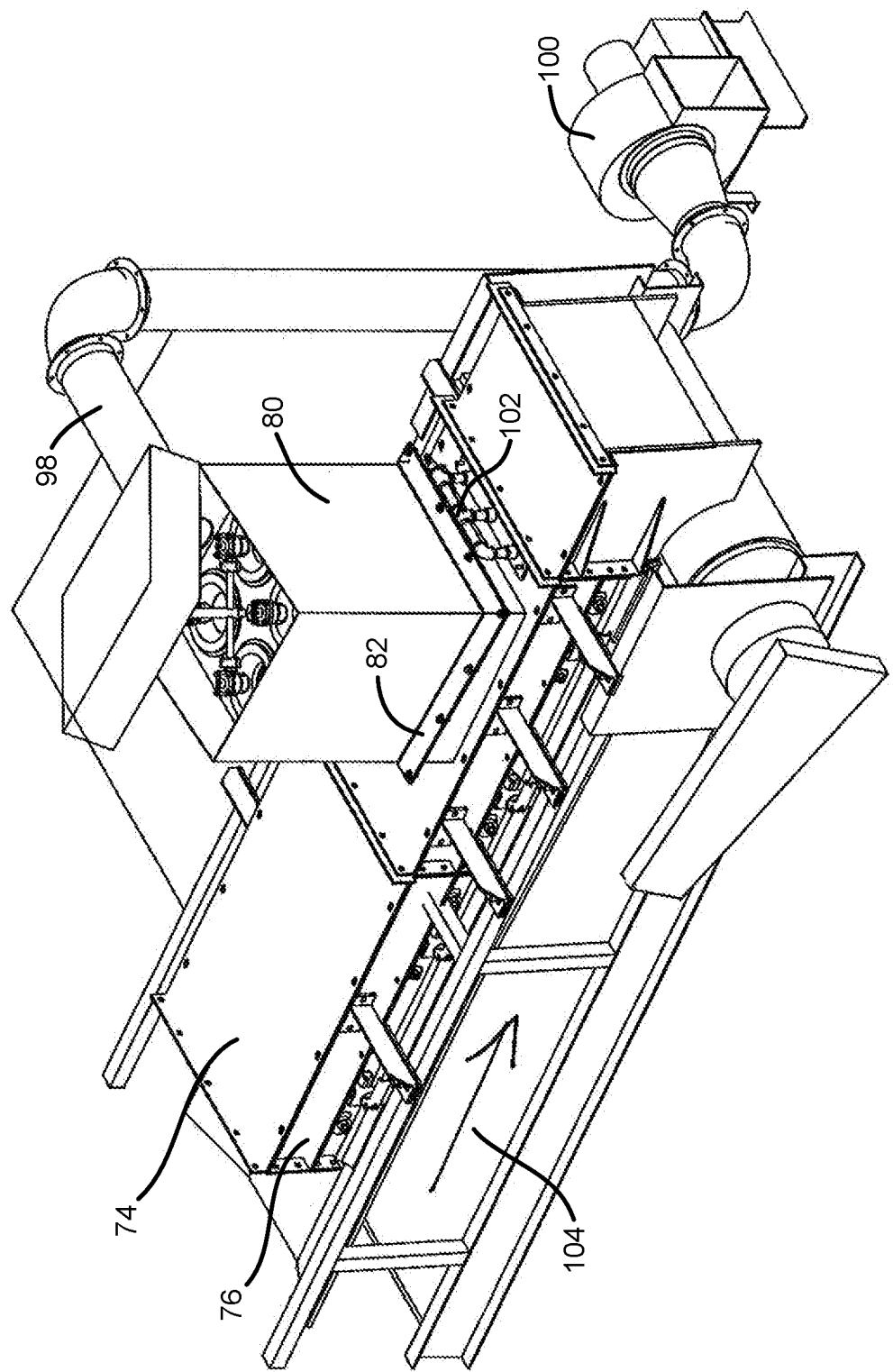
FIG. 11 is a perspective view of the second side of the dust filtering system and conveyor skirt system of FIG. 7.
Figure 12:
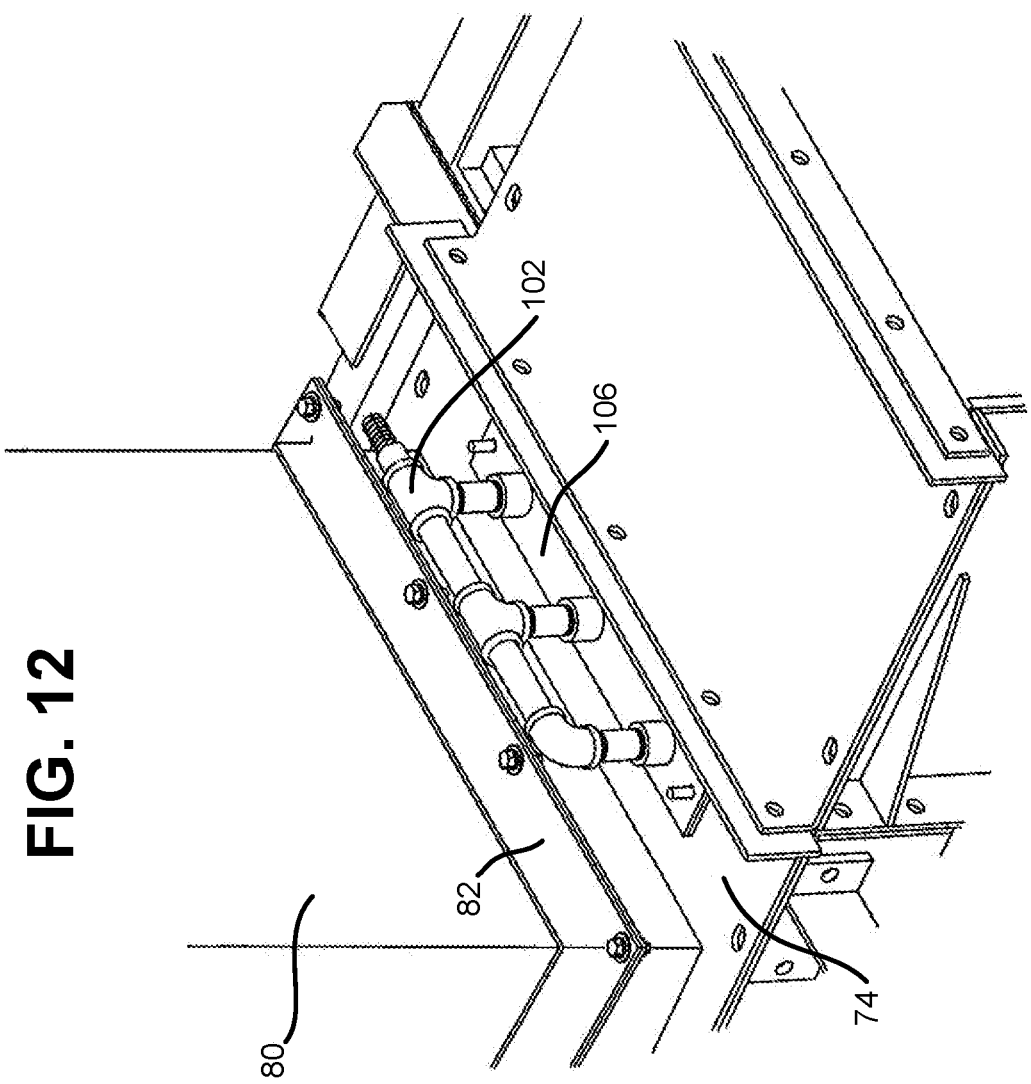
FIG. 12 is an enlarged perspective view of a portion of the dust filtering system and conveyor skirt system of FIG. 7.

The air purge system 25 includes a differential pressure switch set to measure the air pressure between the area of the interior chamber exposed to the interior of the bulk storage tank through the hatch, and the clean air plenum—that is, the pressure differential across the filter elements 24. When this differential pressure reaches a set point—due to buildup of dust on the outer surfaces of the filter elements 24—a purge circuit is activated. The purge circuit and pressure differential switch are positioned in a solenoid valve enclosure 46 located between a reservoir of compressed air 48 and a distribution manifold 50 in the clean air plenum. As shown in FIG. 5, a tube 47 extending from the pressure differential switch in the enclosure 46 to a bulk headp 49 on the separator plate 34 provides a pressure from the dust exposed lower portion of the dust containment unit 14, which gets measured against the atmospheric pressure in the clean air plenum. The solenoid enclosure 46 can be a Goyen NEMA4 pilot valve enclosure which includes four solenoid valves.

The distribution manifold 50 includes four branches 52 that end in diaphragm valves 54 positioned directly over the open ends of each of the filter elements 24. When the circuit is activated, air from the compressed air tank 48 is pulsed into each of the filter elements 24. This forces the dust on the outer surfaces of the filter elements 24 back into the bulk material storage tank 12. All four of the filter elements 24 can be pulsed simultaneously, or they can be pulsed one at a time, or in some other combination. A capacitive discharge control circuit—which can be located in the solenoid enclosure 46—can be used to regulate the sequence, timing and duration of the pulse cycle.

The filter containment unit 14 can include a dust detection sensor 56 in the air plenum of the interior chamber. The dust detection sensor 56 can measure the presence of dust in the clean air plenum and act as a contamination indicator that verifies whether or not any of the filter elements 24 are damaged or not properly mounted in the unit 14. If the sensor 56 detects dust, an alarm can be triggered to signal the need to service the unit 14.

A control box 58 (which can hold the purge circuit and/or any other control components) can be mounted on the outer surface of one of the side walls 16 as shown in FIG. 1. Additionally, a latch 60 or other closure mechanism can be utilized to keep the lid in a closed position. A lid handle 62 can be installed on the top 18.

The dust filtering and conveyor skirting system of the present invention is illustrated in FIGS. 7-13. The system is utilized to remove or suppress dust generated from dry bulk materials transported on a conveyor belt.

The conveyor skirting system 70 is mounted over a portion of a conveyor belt 72 which is used to move dry bulk materials from one location to another. The skirting system 70 includes a top 74, a first side wall 76 extending downward from a first side of the top 74, and a second side wall 78 extending downward from a second side of the top 74. The skirting system 70 spans the width of the conveyor belt 72.

A dust filtering system 80 is connected over an opening in the top 74 of the skirting system 70. The dust filtering system 80 is preferably a modified version of the filtering system 10 shown in FIGS. 1-6, however, other systems can be used. The dust filtering system 80 can be secured to the top 74 of the conveyor system 70 by a mounting flange 82. The mounting flange 82 can be attached to the top via bolts 84 or other means (e.g., the magnetic switches of FIGS. 1-6).

Figure 13:
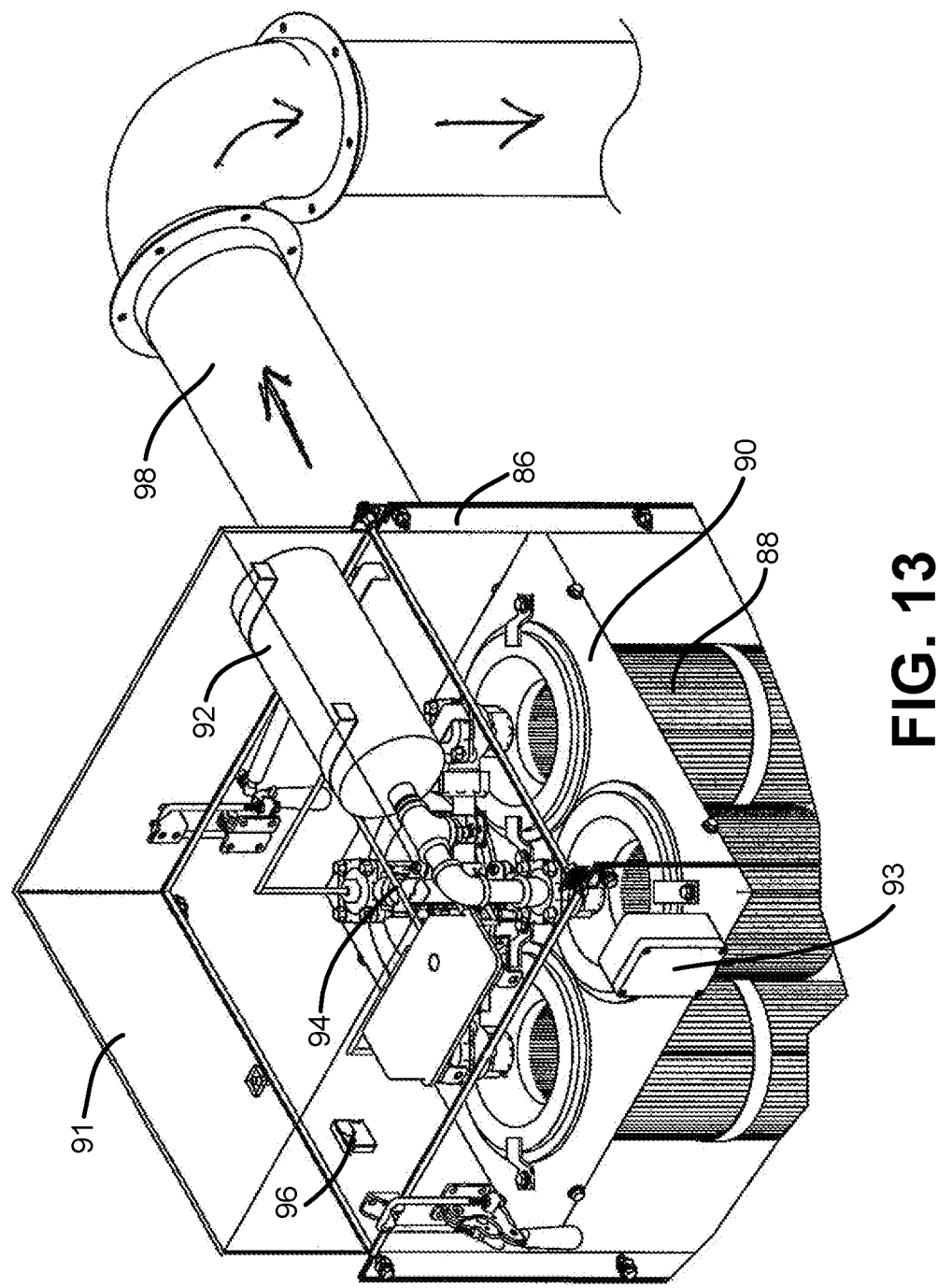
FIG. 13 is an enlarged partial phantom perspective view of a portion of the dust filtering system and conveyor skirt system of FIG. 7; and, FIG. 14 is a side view of multiple dust filtering systems on a dry bulk storage tank.
Figure 14:
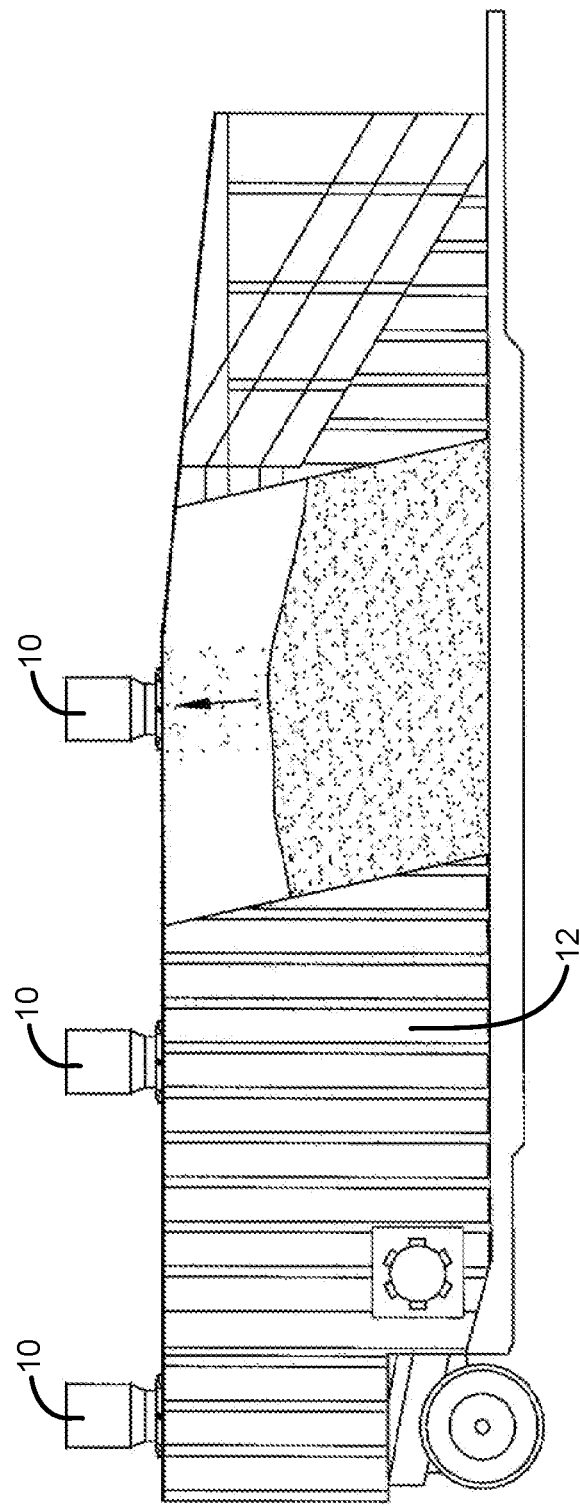

As shown in FIG. 13, the dust filtering system 80 includes a filter containment unit 86 housing a plurality of cylindrical filters 88 supported by a separation plate 90. The separation plate 90 divides an interior chamber of the filter containment unit 86 into an upper clean air plenum 91 and a lower chamber exposed to the conveyor belt 72 through the opening in the top 74 of the skirting system 70. An air purge system having a supply of compressed air 92 connected to a purge manifold 94 is supported in the clean air plenum 91. Additionally, the clean air plenum 91 also includes a dust detection sensor 96 and other features as shown and described with respect to the system of FIGS. 1-6. A control box 93 can be secured to the outside of the filter containment unit 86.

The system further includes a discharge plenum 98 connected to an outlet of the filter containment unit 86. The discharge plenum 98 comprises one or more ducts or pipes that funnel the clean air from the filtering system 80 to a remote location. A blower fan 100 can be attached to the discharge plenum 98 to draw air from clean air plenum 91 of the filter containment unit 86 and facilitate air flow through and out of the discharge plenum 98.

In addition to the dust filtering system 80, a suppression spray manifold 102 is also attached to the top 74 of the skirting system 70 downstream (i.e., in the direction 104 of the conveyor belt 72) of the dust filtering system 80. The suppression spray manifold 102 is connected to the top 74 of the skirting system 70 by a mounting plate 106. The suppression spray manifold 102 is also connected to a supply of water or a chemical solution used for suppressing dust by a hose (not shown). The suppression spray manifold 102 includes one or more spray nozzles for spraying the solution onto the material being transported on the conveyor 72.

In operation, dust laden air from the conveyor belt 72 enters the filter system 80 connected to the top 74 of the skirting system 70. The dust is trapped on the outside of the filter elements 88 and clean air enters the clean air plenum 91. The blower 100 from the discharge plenum 98 draws the clean air from the filtering system 80 (the blower 100 may also be drawing the dust laden air from the conveyor belt into the filtering system 80). When the filters elements 88 are covered in an amount of dust such that the pressure across the elements 88 reaches a certain point, the air purge system is activated and the dust is pulsed off of the filter elements 88 and back onto the conveyor belt 72 (alternatively, the air purge system can be set up to pulse on a periodic basis or some timed sequence without the need for measuring the pressure differential). The suppression spray manifold 102 is activated after the air pulse to suppress the dust generated by the air pulse. A controller can control the sequencing of the air pulse system and the suppression spray manifold 102.

Many modifications and variations of the present invention are possible in light of the above teachings. It is, therefore, to be understood within the scope of the appended claims the invention may be protected otherwise than as specifically described.

I claim:

1. A system for handling dust on a conveyor transporting dry bulk materials comprising:
    a conveyor skirt having a top, a first wall extending downward from a first side of the top and a second side wall extending downward from a second side of the top;
    a dust filtering system having a filter containment unit, a plurality of filter elements secured in the filter containment unit, an air purge system, a mounting flange, and a plurality of magnetically operated magnetic switches coupled to and spaced around the mounting flange wherein the dust filtering system is magnetically coupled to the conveyor skirt top, over an opening in the top of the conveyor skirt, when the plurality of magnetically operated magnetic switches are switched to an on position, and magnetically decoupled from the conveyor skirt top when the plurality of magnetically operated magnetic switches are switched to an off position;

the air purge system comprising an air purge manifold coupled at a first end to a supply of compressed air and at a second end to a plurality of diaphragm valves disposed over and spaced apart from the plurality of filter elements configured to pulse compressed air; and an air discharge plenum connected to the dust filtering system.

2. The system of claim 1 further comprising a dust suppression spray manifold connected to the top of the conveyor skirt downstream from the dust filtering system.

3. The system of claim 1 wherein the dust filtering system includes a differential pressure switch coupled to the air purge system.

4. The system of claim 3 wherein the air discharge plenum comprises a duct connected to an opening in the filter containment unit, wherein the duct extends away from the filter containment unit to a remote location.

5. The system of claim 4 wherein the air discharge plenum comprises a blower fan coupled to the duct.

6. The system of claim 2 wherein the dust suppression spray manifold is connected to a supply of a dust suppression chemical solution.

7. The system of claim 2 wherein the dust suppression spray manifold is connected to the top of the conveyor skirt by a mounting plate.

8. The system of claim 3 wherein each of the filter elements is a cylindrical filter having a first closed end and a second open end mounted to a separation plate in the filter containment unit, the separation plate and the filter elements defining a clean air plenum on one side of the separation plate.

9. The system of claim 8 wherein the filter containment unit includes a dust detection sensor in the clean air plenum.

10. The system of claim 2 wherein the dust suppression spray manifold is activated after activation of the air purge system.

11. The system of claim 1 wherein the filter containment unit includes a body portion and a top hingedly attached to the body portion.

12. The system of claim 8 further comprising a control circuit for regulating the air purge system wherein the control circuit is configured receive a threshold differential pressure set point from the differential pressure switch and selectively activate any number of diaphragm valves of the plurality of diaphragm valves causing the selectively activated diaphragm valve or selectively activated diaphragm valves to pulse an interior portion of a corresponding filter element or corresponding filter elements of the plurality of filter elements with compressed air.

13. A system for handling dust on a conveyor transporting dry bulk materials comprising:

a conveyor skirt having a top, a first wall extending downward from a first side of the top and a second side wall extending downward from a second side of the top;

a dust filtering system including a filter containment unit housing, a plurality of filter elements, an air purge system, a mounting flange, and a plurality of magnetically operated magnetic switches coupled to and spaced around the mounting flange wherein the dust filtering system is magnetically coupled to the conveyor skirt top, over an opening in the top of the conveyor skirt, when the plurality of magnetically operated magnetic switches are switched to an on position, and magnetically decoupled from the conveyor skirt top when the plurality of magnetically operated magnetic switches are switched to an off position; and a dust suppression spray manifold connected to the top of the conveyor skirt downstream from the dust filtering system.

14. The system of claim 13 further comprising an air discharge plenum connected to the dust filtering system wherein the air discharge plenum comprises a duct connected to an opening in the filter containment unit, wherein the duct extends away from the filter containment unit to a remote location.

15. The system of claim 14 wherein the air discharge plenum comprises a blower fan coupled to the duct.

16. The system of claim 13 wherein the dust suppression spray manifold is connected to a supply of a dust suppression chemical solution or water supply.

17. The system of claim 13 wherein the dust suppression spray manifold is activated upon or after activation of the air purge system.

18. The system of claim 13 wherein the dust filtering system comprises:

a filter containment unit;

a plurality of filter elements secured in the filter containment unit; and, the air purge system comprising an air purge manifold coupled at a first end to a supply of compressed air and at a second end to a plurality of diaphragm valves disposed over and spaced apart from the plurality of filter elements.

19. The system of claim 18 wherein each of the filter elements is a cylindrical filter having a first closed end and a second open end mounted to a separation plate in the filter containment unit, the separation plate and the filter elements defining a clean air plenum on one side of the separation plate.

20. The system of claim 19 further comprising a dust detection sensor configured to measure dust presence in the clean air plenum and further comprising a control circuit for regulating the air purge system wherein the control circuit is configured receive a threshold differential pressure set point from a differential pressure switch and selectively activate any number of diaphragm valves of the plurality of diaphragm valves causing the selectively activated diaphragm valve or selectively activated diaphragm valves to pulse an interior portion of a corresponding filter element or corresponding filter elements of the plurality of filter elements with compressed air.

21. The system of claim 20 wherein the control circuit is coupled to and configured to control at least one solenoid valve, the at least one solenoid valve configured in an open position to allow flow of compressed air to the at least one diaphragm valve and in a closed position stop the follow of compressed air to the at least one diaphragm valve.

22. The system of claim 12 wherein the control circuit is coupled to and configured to control at least one solenoid valve, the at least one solenoid valve configured in an open position to allow flow of compressed air to the at least one diaphragm valve and in a closed position stop the follow of compressed air to the at least one diaphragm valve.

* * * * *